(12) United States Patent
Lyu et al.

(10) Patent No.: US 11,183,811 B2
(45) Date of Patent: Nov. 23, 2021

(54) CONTROL SYSTEM AND METHOD FOR LASER PROJECTOR, AND TERMINAL

(71) Applicant: GUANGDONG OPPO MOBILE TELECOMMUNICATIONS CORP., LTD., Guangdong (CN)

(72) Inventors: Xiangnan Lyu, Dongguan (CN); Jian Bai, Dongguan (CN); Biao Chen, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 200 days.

(21) Appl. No.: 16/422,920

(22) Filed: May 24, 2019

(65) Prior Publication Data

US 2019/0372305 A1    Dec. 5, 2019

(30) Foreign Application Priority Data

May 30, 2018  (CN) .......................... 201810539043.5
May 30, 2018  (CN) .......................... 201810540382.5

(51) Int. Cl.
*H01S 5/042* (2006.01)
*G01S 7/484* (2006.01)
(Continued)

(52) U.S. Cl.
CPC .............. *H01S 5/042* (2013.01); *G01S 7/484* (2013.01); *G01S 17/10* (2013.01); *H01S 5/02255* (2021.01); *H01S 5/12* (2013.01)

(58) Field of Classification Search
CPC ........ H01S 5/042; H01S 5/02255; H01S 5/12; G01S 7/484; G01S 17/10; H04N 9/3179;
(Continued)

(56) References Cited

U.S. PATENT DOCUMENTS 9,959,626 B2     5/2018  Yanhui
2008/0291405 A1* 11/2008  Nagate ................. H04N 9/3155
                                                       353/85
(Continued)

FOREIGN PATENT DOCUMENTS

CN       102202133 A    9/2011
CN       102227313 A   10/2011
(Continued)

OTHER PUBLICATIONS

Office Action of the Indian application No. 201914021178, dated Jan. 8, 2021.
(Continued)

*Primary Examiner* — David P Porta
*Assistant Examiner* — Meenakshi S Sahu
(74) *Attorney, Agent, or Firm* — Ladas & Parry, LLP

(57) ABSTRACT

A control system (30) for a laser projector (10), a terminal (100) and a control method for the laser projector (10) are provided. The control system (30) includes a first driving circuit (31), a microprocessor (35) and an application processor (33). The first driving circuit (31) is connected with the laser projector (10). The first driving circuit (31) is configured to drive the laser projector (10) to project laser. The microprocessor (35) is connected with the first driving circuit (31). The application processor (33) is connected with the microprocessor (35). The application processor (33) is configured to send a control signal to the microprocessor (35) according to a distance between a human eye and the laser projector (10). The microprocessor (35) controls the first driving circuit (31) according to the control signal to enable the laser projector (10) to project laser according to a predetermined parameter.

12 Claims, 9 Drawing Sheets

(51) Int. Cl.
  *G01S 17/10* (2020.01)
  *H01S 5/02255* (2021.01)
  *H01S 5/12* (2021.01)

(58) Field of Classification Search
  CPC ...... H04N 9/3164; H04N 9/3173; H04N 5/33; H04N 9/3135; H04N 9/3194; G01B 11/2513
  See application file for complete search history.

(56) References Cited

U.S. PATENT DOCUMENTS

| | | | |
|---|---|---|---|
| 2012/0120375 | A1 | 5/2012 | Kilcher |
| 2014/0204966 | A1 | 7/2014 | Tsai |
| 2015/0116672 | A1* | 4/2015 | Woltman ............ H04N 9/3194 353/85 |
| 2015/0341609 | A1 | 11/2015 | Kilcher et al. |
| 2017/0048505 | A1 | 2/2017 | Kilcher et al. |
| 2017/0054962 | A1 | 2/2017 | Yanhui |
| 2018/0113200 | A1 | 4/2018 | Steinberg et al. |
| 2018/0120424 | A1 | 5/2018 | Eshel et al. |
| 2018/0120441 | A1* | 5/2018 | Elooz ..................... G01S 17/89 |
| 2018/0128920 | A1 | 5/2018 | Keilaf et al. |
| 2018/0136331 | A1 | 5/2018 | Rosenzweig et al. |
| 2018/0136337 | A1 | 5/2018 | Zohar et al. |
| 2018/0143302 | A1 | 5/2018 | Osiroff et al. |
| 2018/0143304 | A1 | 5/2018 | Rosenzweig et al. |
| 2018/0143305 | A1 | 5/2018 | Buskila et al. |
| 2018/0143306 | A1 | 5/2018 | Elooz et al. |
| 2018/0143307 | A1 | 5/2018 | Steinberg et al. |
| 2018/0143308 | A1 | 5/2018 | Vlaiko et al. |
| 2018/0143322 | A1 | 5/2018 | Rosenzweig et al. |
| 2018/0143324 | A1 | 5/2018 | Keilaf et al. |
| 2018/0332262 | A1 | 11/2018 | Kilcher et al. |
| 2019/0212450 | A1 | 7/2019 | Steinberg et al. |
| 2019/0271769 | A1 | 9/2019 | Raly et al. |

FOREIGN PATENT DOCUMENTS

| | | |
|---|---|---|
| CN | 202087920 U | 12/2011 |
| CN | 102377102 A | 3/2012 |
| CN | 102821210 A | 12/2012 |
| CN | 103327146 A | 9/2013 |
| CN | 203366017 U | 12/2013 |
| CN | 104952221 A | 9/2015 |
| CN | 105141939 A | 12/2015 |
| CN | 105373223 A | 3/2016 |
| CN | 105823426 A | 8/2016 |
| CN | 105911703 A | 8/2016 |
| CN | 106226977 A | 12/2016 |
| CN | 106331517 A | 1/2017 |
| CN | 106572340 A | 4/2017 |
| CN | 105141939 B | 5/2017 |
| CN | 206311139 U | 7/2017 |
| CN | 107005023 A | 8/2017 |
| CN | 107105217 A | 8/2017 |
| CN | 107122032 A | 9/2017 |
| CN | 107124484 A | 9/2017 |
| CN | 107424187 A | 12/2017 |
| CN | 107451561 A | 12/2017 |
| CN | 107564050 A | 1/2018 |
| CN | 107968938 A | 4/2018 |
| CN | 108767653 A | 11/2018 |
| CN | 109066288 A | 12/2018 |
| CN | 107124484 B | 2/2019 |
| WO | 2009031094 A1 | 3/2009 |
| WO | 2011012168 A1 | 2/2011 |

OTHER PUBLICATIONS

Fourth Office Action of the Chinese application No. 201810540382.5, dated Mar. 3, 2021.
Third Office Action of the Chinese application No. 201810540382.5, dated Aug. 6, 2020.
First Office Action of the Chinese application No. 201810540382.5, dated Jun. 3, 2019.
First Office Action of the Chinese application No. 201810539043.5, dated Feb. 22, 2019.
Interpretation of key technologies and standards of mobile finance, First edition; "2.8 Trusted Execution Environment (TEE) technology", p. 98-102.
European Search Report in the European application No. 19177196.3, dated Mar. 19, 2020.
First Office Action of the Taiwanese application No. 108118730, dated Apr. 30, 2020.
Notice of Rejection of the Chinese application No. 201810539043.5, dated Dec. 18, 2019.
Second Office Action of the Chinese application No. 201810539043.5, dated May 31, 2019.
Factors Affecting the Extent of Damage adapted from Introduction to Laser History / Lei Shizhan, Liu Dean, Zhang Yanli, published on Oct. 31, 2013.
International Search Report in the international application No. PCT/CN2019/075392, dated May 14, 2019.
Written Opinion of the International Search Authority in the international application No. PCT/CN2019/075392, dated May 14, 2019.
Third Office Action of the Chinese application No. 201810539043.5, dated Sep. 25, 2019.
Partial Supplementary European Search Report in the European application No. 19177196.3, dated Nov. 11, 2019.
Second Office Action and search report of the Chinese application No. 201810540382.5, dated Jan. 19, 2020.
Zhang Mindge, Sun Xiaohan, "Fiber optic communication principle and system", <Southeast University Press>, Jan. 2009, (fourth edition), entire document.
Decision of Refusal of the Chinese application No. 201810540382.5, dated Jul. 8, 2021.

* cited by examiner

CONTROL SYSTEM AND METHOD FOR LASER PROJECTOR, AND TERMINAL

CROSS-REFERENCE TO RELATED APPLICATIONS

The present application claims priority and benefit to Patent Applications No. 201810540382.5 and No. 201810539043.5, both of which were filed before the State Intellectual Property Office of P. R. China on May 30, 2018, the contents of which are hereby incorporated by reference in their entireties.

BACKGROUND

A mobile phone may be provided with a laser generator. The laser projector may project laser with predetermined pattern information, project laser onto a target user in a space and then acquire a laser pattern reflected by the target user through an imaging device to further obtain a depth image of the target user.

SUMMARY

The application relates to the technical field of consumer electronics, and more particularly to a control system and method for a laser projector, and a terminal.

Implementation modes of the application provide a control system for a laser projector, a terminal and a control method for the laser projector.

The control system for a laser projector in the implementation modes of the application includes a first driving circuit, a microprocessor and an application processor. The driving circuit may be connected with the laser projector, and the first driving circuit may be configured to drive the laser projector to project laser. The microprocessor may be connected with the first driving circuit. The application processor may be connected with the microprocessor. The application processor may be configured to send a control signal to the microprocessor according to a distance between a human eye and the laser projector, and control the first driving circuit according to the control signal to enable the laser projector to project laser according to a predetermined parameter.

The terminal according to the implementation modes of the application includes a laser projector and the control system in the abovementioned implementation modes. The first driving circuit may be connected with the laser projector.

The laser projector in the implementation modes of the application may be connected with the first driving circuit. The control method for the laser projector may include that: an application processor sends a control signal to a microprocessor according to a distance between a human eye and the laser projector; and the microprocessor controls the first driving circuit according to the control signal to enable the laser projector to project laser according to a predetermined parameter.

Additional aspects and advantages of the implementation modes of the application will be partially presented in the descriptions hereinafter and partially become apparent from the following descriptions or get understood by implementing the implementation modes of the application.

BRIEF DESCRIPTION OF DRAWINGS

The abovementioned and/or additional aspects and advantages of the application will become apparent and easy to be understood from the descriptions made to the implementation modes below in combination with the drawings.

DETAILED DESCRIPTION

Figure 1:
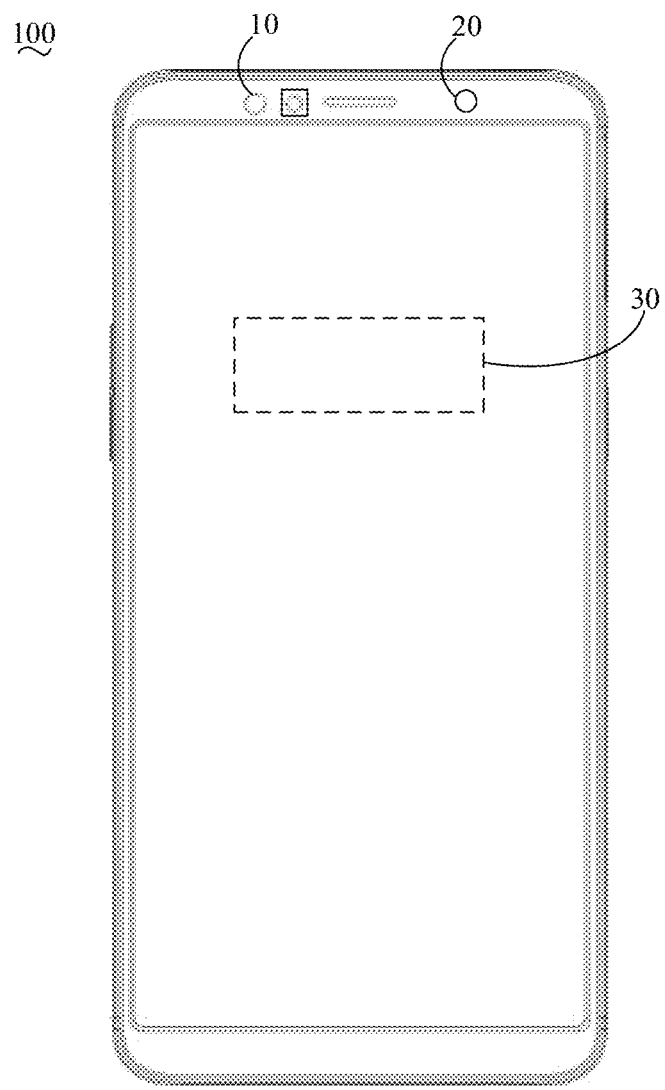
FIG. 1 is a structure diagram of a terminal according to an implementation mode of the application.

The implementation modes of the application will further be described below in combination with the drawings. The same or similar reference signs in the drawings always represent the same or similar components or components with the same or similar functions.

In addition, the implementation modes of the application described below in combination with the drawings are exemplary and only adopted to explain the implementation modes of the application and should not be understood as limits to the application.

In the application, unless otherwise specified and limited definitely, the state that a first feature is "above" or "below" a second feature may refer to that the first and second features directly contact or the first and second features indirectly contact through a medium. Moreover, the state that the first feature is "above", "over" and "on" the second feature may refer to that the first feature is over or above the second feature or only represents that a horizontal height of the first feature is larger than that of the second feature. The state that the first feature is "below", "under" and "beneath" the second feature may refer to that the first feature is under or below the second feature or only represents that the horizontal height of the first feature is smaller than that of the second feature.

Figure 2:
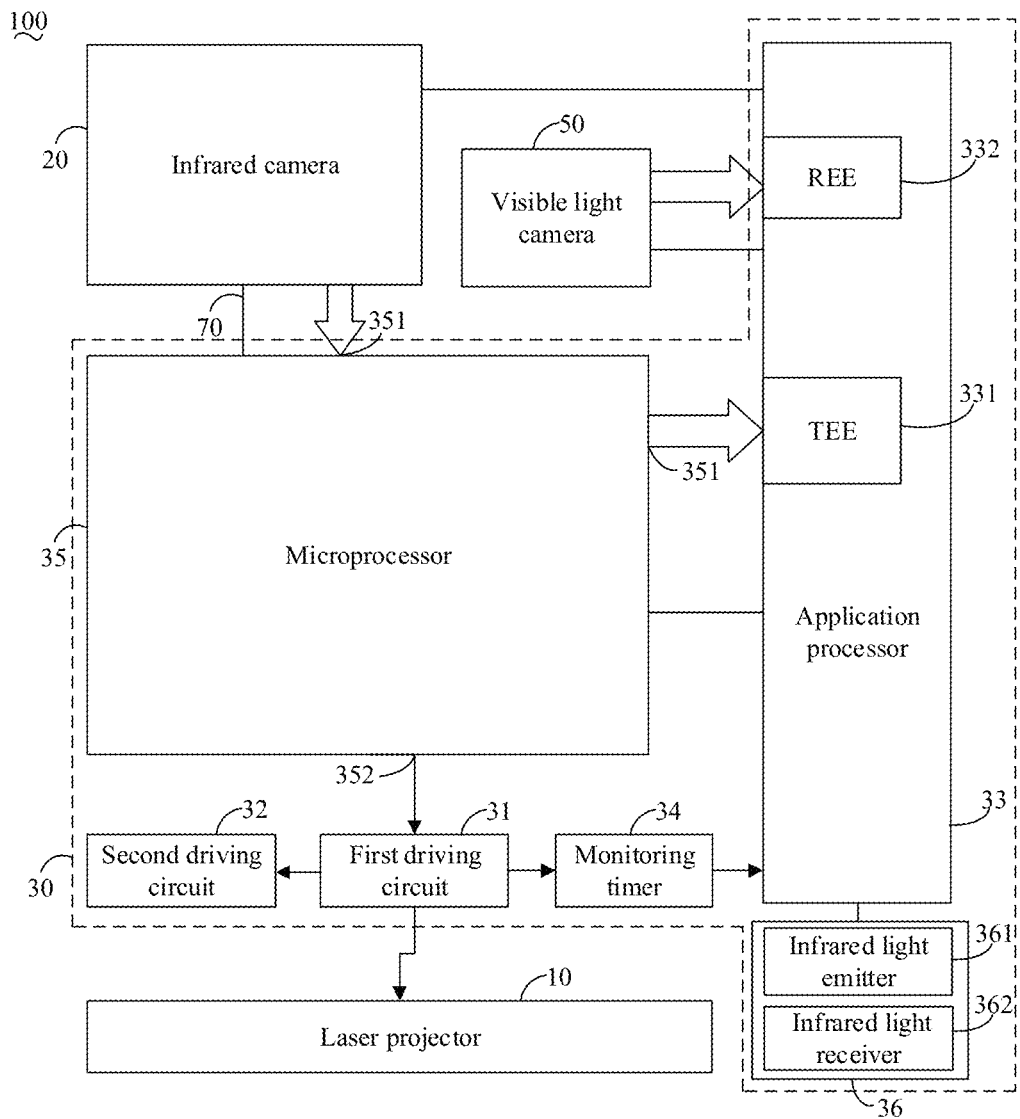
FIG. 2 to FIG. 3 are schematic module diagrams of a terminal according to an implementation mode of the application.

Referring to FIG. 1 and FIG. 2, a terminal 100 of the implementation modes of the application includes a laser projector 10, an infrared camera 20 and a control system 30. The terminal 100 may be a mobile phone, a tablet computer, a smart watch, a smart band, an intelligent wearable device and the like. Descriptions are made in embodiments of the application with the condition that the terminal 100 is a mobile phone as an example. It can be understood that the terminal 100 is not limited to a mobile phone.

The laser projector 10 may project laser to a target object, and the laser may be infrared light. In addition, the laser projected by the laser projector 10 may be a pattern with specific speckles, stripes or the like. The infrared camera 20 may acquire an infrared image of the target object or receive a laser pattern modulated by the target object. For obtaining a relatively sharp laser pattern, it is usually required to continuously emit multiple frames of laser with certain optical power to the target object.

The control system 30 may include a first driving circuit 31, a second driving circuit 32, an application processor 33, a monitoring timer 34, a microprocessor 35 and a distance sensor 36.

The first driving circuit 31 may be connected with the laser projector 10, and the first driving circuit 31 may be configured to drive the laser projector 10 to project laser. Specifically, the first driving circuit 31 may be used as a current source of the laser projector 10, and if the first driving circuit 31 is switched off, the laser projector 10 may not externally emit the laser. The second driving circuit 32 may be connected with the first driving circuit 31, and the second driving circuit 32 may be configured to supply power to the first driving circuit 31. For example, the first driving circuit 31 may be a Direct Current (DC)/DC circuit. The first driving circuit 31 may be independently encapsulated to be a driving chip, the second driving circuit 32 may also be independently encapsulated to be a driving chip, the first driving circuit 31 and the second driving circuit 32 may also be encapsulated into a driving chip. The driving chips may all be arranged on a substrate or circuit board of the laser projector 10.

The application processor 33 may be used as a system of the terminal 100. The application processor 33 may be connected with the first driving circuit 31, and the application processor 33 may further be connected with the infrared camera 20. The application processor 33 may further be connected with multiple electronic components of the terminal 100 and control the multiple electronic components to run according to a predetermined mode, for example, controlling a display screen of the terminal 100 to display a predetermined picture, controlling an antenna of the terminal 100 to send or receive predetermined data, controlling a visible light camera 50 of the terminal 100 to acquire a color image and process the color image and controlling power-on/off of the infrared camera 20, turning-off (pwdn) of the infrared camera 20 or resetting of the infrared camera 20.

The application processor 33 may further be configured to control the first driving circuit 31 to work to drive the laser projector 10 to project laser. It can be understood that the first driving circuit 31 may right be in a state of keeping driving the laser projector 10 to emit laser when a running failure occurs to the application processor 33, for example, the application processor 33 goes down, and that the continuously externally emitted laser is dangerous and likely to burn a user, particularly likely to harm eyes of the user. Therefore, it is required to monitor a running state of the application processor 33 and timely turn off the laser projector 10 when the running failure occurs to the application processor 33.

For monitoring the running state of the application processor 33, the application processor 33 may send a predetermined signal to the monitoring timer 34 at a predetermined time interval, for example, sending a clearing signal to the monitoring timer 34 every 50 milliseconds. When the running failure occurs to the application processor 33, the application processor 33 cannot run a program of sending the predetermined signal to the monitoring timer 34 and thus cannot send the predetermined signal to detect a failure state of the application processor 33.

Still referring to FIG. 1 and FIG. 2, the monitoring timer 34 may be connected with the first driving circuit 31, the monitoring timer 34 may be connected with the application processor 33, and the monitoring timer 34 may be configured to, in a case of not receiving the predetermined signal within a predetermined duration, switch off the first driving circuit 10 to turn off the laser projector 10. The predetermined duration may be set before the terminal 100 leaves the factory, and may also be self-defined in the terminal 100 by a user.

Specifically, in the embodiments of the application, the monitoring timer 34 may be a counter. After the monitoring timer 34 receives a predetermined signal, the monitoring timer 34 may start counting down at a certain speed from a number. If the application processor 33 works normally, before countdown to 0, the application processor 33 may send the predetermined signal again, and the monitoring timer 34, after receiving the predetermined signal, resets a countdown. If the application processor 33 does not work normally, when the monitoring timer 34 counts down to 0, the monitoring timer 34 may determine the running failure of the application processor 33, and in such case, the monitoring timer 34 may send a signal to switch off the first driving circuit 31 to turn off the laser projector 10.

In an example, the monitoring timer 34 may be arranged outside the application processor 33, the monitoring timer 34 may be an external timer chip, and the monitoring timer 34 may be connected with an Input/Output (I/O) pin of the application processor 33 to receive the predetermined signal sent by the application processor 40. Working reliability of the external monitoring timer 34 is relatively high. In another example, the monitoring timer 34 may be integrated into the application processor 33, and a function of the monitoring timer 34 may be realized by an internal timer of the application processor 33, so that a hardware circuit of the control system 30 may be simplified.

In some implementation modes, the monitoring timer 34 may be further configured to, when the predetermined signal is not received within the predetermined duration, send a resetting signal configured to restart the application processor 33. As described above, the application processor 33 has failed when the monitoring timer 34 receives the predetermined signal within the predetermined duration, and in such case, the monitoring timer 34 may send a resetting signal to reset the application processor 33 for normal work.

Specifically, in an example, the resetting signal may be directly received by the application processor 33. The resetting signal has a relatively high priority in an executive program of the application processor 33, and the application processor 33 may preferentially respond to the resetting signal and get reset. In another example, the resetting signal may also be sent to an external resetting chip of the application processor 33, and the resetting chip, after responding to the resetting signal, may forcibly reset the application processor 33.

In some implementation modes, the predetermined duration may be [50, 150] milliseconds. Specifically, the predetermined duration may be set to be 50 milliseconds, 62 milliseconds, 75 milliseconds, 97 milliseconds, 125 milliseconds, 150 milliseconds and any duration in this interval. It can be understood that, if the predetermined duration is set to be too short, the application processor 33 may be required to send the predetermined signal frequently, resulting in that a processing space of the application processor 33 is excessively occupied and thus making the terminal 100 unlikely to run fluently. If the predetermined duration is set to be too long, the failure of the application processor 33 cannot be timely detected, that is, the laser projector 10 cannot be timely turned off, which is unfavorable for safe use of the laser projector 10. High compatibility between fluency and safety of the terminal 100 can be achieved by setting the predetermined duration to be [50, 150] milliseconds.

Referring to FIG. 2, the microprocessor 35 may be a processing chip, the microprocessor 35 may be connected with the application processor 33, the microprocessor 35 may be connected with the first driving circuit 31, and the microprocessor 35 may also be connected with the infrared camera 20.

The microprocessor 35 may be connected with the application processor 33 to enable the application processor 33 to reset the microprocessor 35, wake the microprocessor 35, debug the microprocessor 35 and the like, and the microprocessor may be connected with the application processor 33 through a Mobile Industry Processor Interface (MIPI) 351. Specifically, the microprocessor 35 may be connected with a Trusted Execution Environment (TEE) 331 of the application processor 33 through the MIPI 351 to directly transmit data in the microprocessor 35 to the TEE 331. A code and memory region in the TEE 331 may be controlled by an access control unit, but cannot be accessed by a program in a Rich Execution Environment (REE) 332. Both of the TEE 331 and the REE 332 may be formed in the application processor 33.

The microprocessor 35 may be connected with the first driving circuit 31 through a Pulse Width Modulation (PWM) interface 352. The microprocessor 35 may be connected with the infrared camera 20 through an Inter-Integrated Circuit (I2C) bus 70. The microprocessor 35 may provide the infrared camera 20 with clock information for acquisition of the infrared image and the laser pattern. The infrared image and laser pattern acquired by the infrared camera 20 may be transmitted to the microprocessor 35 through the MIPI 351.

In an embodiment, an infrared template and a depth template configured for identity authentication may be stored in the REE 331. The infrared template may be a face infrared image pre-input by a user, and the depth template may be a face depth image which is pre-input by the user. The infrared template and the depth template may be stored in the REE 331 and unlikely to falsify or steal, so that security of information in the terminal 100 is high.

When identity authentication over a user is required, the microprocessor 35 may control the infrared camera 20 to acquire an infrared image of the user and, after acquiring the infrared image, transmit it to the TEE 331 of the application processor 33. The application processor 33 may be compare the infrared image with the infrared template in the TEE 331, and if they are matched, the application processor 33 may output an authentication result indicative of successful infrared template authentication. In a comparison process for determining whether they are matched or not, the infrared image and the infrared template may not be acquired, falsified or stolen by other program, so that the security of the information in the terminal 100 is improved.

Furthermore, the microprocessor 35 may control the first driving circuit 31 to drive the laser projector 10 to externally project laser and control the infrared camera 20 to acquire the laser pattern modulated by the target object. The microprocessor 35 may acquire and process the laser pattern to obtain a depth image. The depth image may be transmitted to the TEE 331 of the application processor 33. The application processor 33 may compare the depth image with the depth template in the TEE 331, and if they are matched, output an authentication result indicating successful authentication of the depth template. In a comparison process for determining whether the depth image and the depth template are matched or not, the depth image and the depth template cannot be acquired, falsified or stolen by other program, so that the security of the information in the terminal 100 is improved.

The distance sensor 36 may be connected with the application processor 33, and the distance sensor 36 may be configured to detect a distance between a human eye and the laser projector 10. The distance sensor 36 may be an optical distance sensor, an infrared distance sensor, an ultrasonic distance sensor and the like. In the embodiment of the application, descriptions are made with the condition that the distance sensor 36 is an infrared distance sensor as an example. The distance sensor 36 may include an infrared light emitter 361 and an infrared light receiver 362. The infrared light emitter 361 may be configured to emit infrared light. The infrared light receiver 362 may be configured to receive the infrared light emitted by the infrared light emitter 361 and reflected by a human body to detect the distance between the human eye and the laser projector 10. Specifically, the distance sensor 36 may detect the distance between the human eye and the laser projector 10 according to an intensity of the infrared light received by the infrared light receiver. If the intensity of the infrared light received by the infrared light receiver 362 is higher, the distance between the human eye and the laser projector 10 is shorter; and if the intensity of the infrared light received by the infrared light receiver 362 is lower, the distance between the human eye and the laser projector 10 is longer. The distance sensor 36 may further detect the distance between the human eye and the laser projector 10 according to a time difference between reception of the infrared light by the infrared light receiver 362 and emission of the infrared light by the infrared light emitter 361. If the time different is smaller, the distance between the human eye and the laser projector 10 is shorter; and if the time difference is larger, the distance between the human eye and the laser projector 10 is longer.

The distance sensor 36 may detect the distance between the human eye and the laser projector 10 before the laser projector 10 works, and may also detect the distance between the human eye and the laser projector 10 in real time in a working process of the laser projector 10. Therefore, a change in the distance between the human eye and the laser projector 10 may be timely detected, and a corresponding measure may further be adopted to avoid harms to the human eye.

In an embodiment, the distance sensor 36 may detect the distance between the human eye and the laser projector 10 according to a predetermined period. For example, the distance sensor 36 may detect the distance between the human eye and the laser projector 10 every 500 milliseconds to timely detect the change in the distance between the human eye and the laser projector 10 and take the power consumption of the terminal 100 into consideration.

For preventing interference between the infrared light emitted by the infrared light emitter 361 and the laser projected by the laser projector 10, a frequency (or phase) of infrared light emission of the infrared light emitter 361 may be different from a frequency (or phase) of laser projection of the laser projector 10; or a wavelength of the infrared light emitted by the infrared light emitter 361 may be different from a wavelength of the laser projected by the laser projector 10. For example, the wavelength of the infrared light emitted by the infrared light emitter 361 is $\lambda 1$, and the wavelength of the laser projected by the laser projector 10 is $\lambda 2$, where $\lambda 1 \neq \lambda 2$. Correspondingly, the infrared light receiver 362 may be configured to receive infrared light of which a wavelength is λ1, and the infrared camera 20 may be configured to receive infrared light of which a wavelength is λ2.

Figure 3:
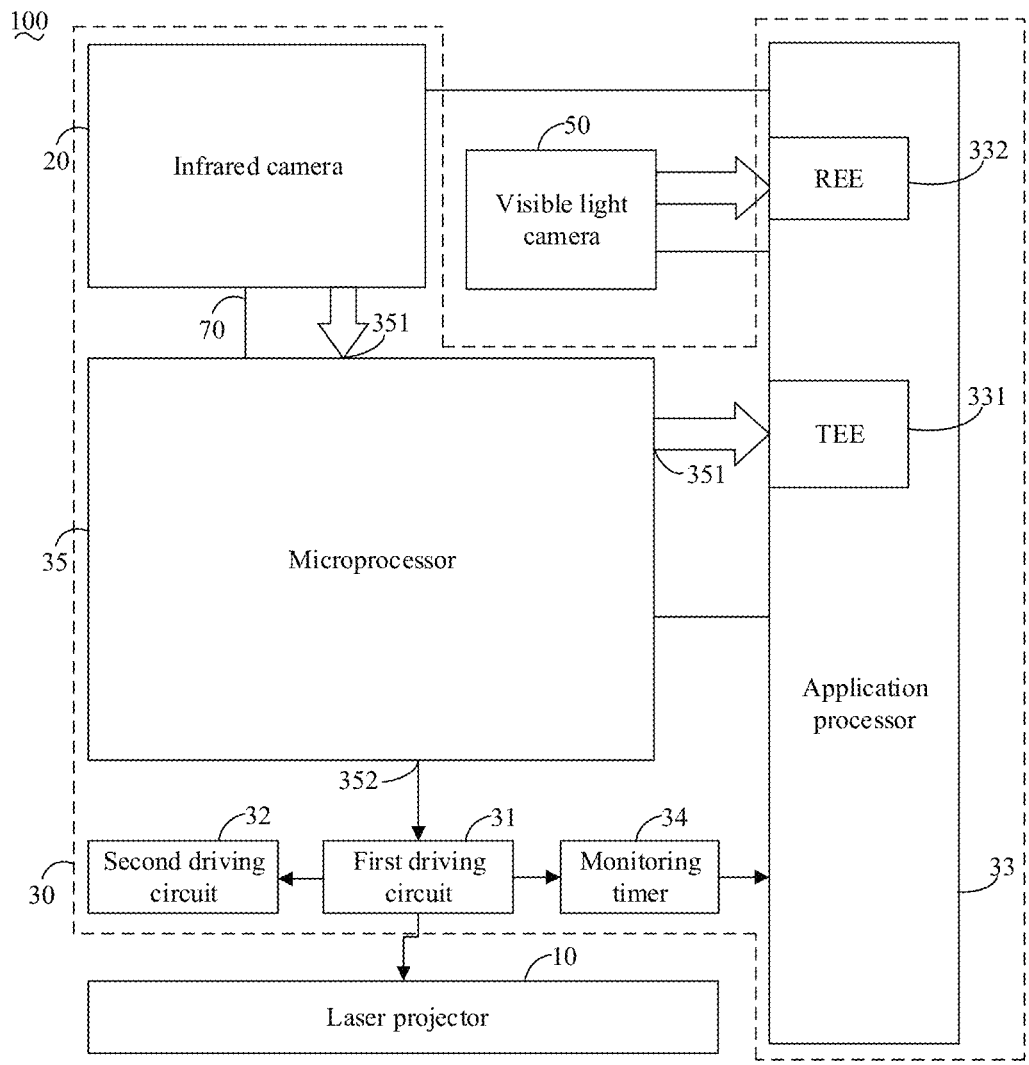

Referring to FIG. 3, in some implementation modes, the manner that the distance between the human eye and the laser projector 10 is detected through the distance sensor 36 may be replaced with a manner that the microprocessor 35 detects the distance between the human eye and the laser projector 10 according to the laser pattern received by the infrared camera 20. In such case, the infrared camera 20 is part of the control system 30.

Specifically, the microprocessor 35 may control the first driving circuit 31 to drive the laser projector 10 to project laser to the target object and control the infrared camera 20 to acquire the laser pattern modulated by the target object, and then the microprocessor 35 may acquire and process the laser pattern to obtain an initial depth image and detect the distance between the human eye and the laser projector 10 according to the depth image. It can be understood that the depth image may include depth data, and the process that the microprocessor 35 detects the distance between the human eye and the laser projector 10 according to the depth image may be as follows: the depth data is converted into point cloud data with a three-dimensional coordinate, a format of the point cloud data being (x, y, z); then filtering processing is performed on the point cloud data to remove an outlier and noise; and the distance between the human eye and the laser projector 10 is acquired according to a z value of the point cloud data subjected to filtering processing. In an example, the microprocessor 35 may determine the distance between the human eye and the laser projector 10 according to a minimum value in multiple z values of the point cloud data to prevent the eyes of the user from being harmed by the laser projected by the laser projector 10. In the embodiment, the laser projector 10 may project laser for infrared distance measurement, and the intensity of the laser projected by the laser projector 10 may be lower than the intensity of the laser projected when the laser projector 10 works normally, so that energy consumption may be reduced, and safety of the human eye in the distance measurement process may be ensured.

In an embodiment, the laser projector 10 may project laser to the target object according to a preset period to periodically detect the distance between the human eye and the laser projector 10. For example, the laser projector 10 may project laser to the target object every 500 milliseconds to detect the distance between the human eye and the laser projector 10 to timely detect the change in the distance between the human eye and the laser projector 10 and take the power consumption of the terminal 100 into consideration.

In some implementation modes, the microprocessor 35 may further control the infrared camera 20 to acquire the infrared image of the user and detect the distance between the human eye and the laser projector 10 according to the depth image in combination with the infrared camera. Specifically, the microprocessor 35 may detect a face key point of the infrared image to determine a two-dimensional coordinate of the human eye, then register and align the infrared image and the depth image, search for a corresponding feature point corresponding to the human eye in the depth image according to the two-dimensional coordinate of the human eye, then acquire a three-dimensional coordinate of the corresponding feature point and acquire the distance between the human eye and the laser projector 10 according to the three-dimensional coordinate of the corresponding feature point. Compared with the manner of detecting the human eye and the laser projector 10 directly according to the depth image, the implementation mode has the advantage that a specific position of the human eye can be detected according to the infrared image, thereby detecting the distance between the human eye and the laser projector 10 more accurately.

After the distance between the human eye and the laser projector 10 is detected in the manners above, the application processor 33 may send a control signal to the microprocessor 35 according to the distance between the human eye and the laser projector 10, and the microprocessor 35 may control the first driving circuit 31 according to the control signal to enable the laser projector 10 to project laser according to a predetermined parameter.

Specifically, the parameter may include at least one of a current parameter (or a power parameter or other parameters positively correlated with the current parameter), a frame rate parameter or a pulse width parameter. That is, the microprocessor 35 may control the first driving circuit 31 according to the control signal to enable the laser projector 10 to project laser according to the predetermined current parameter, or project laser according to the predetermined frame rate parameter or project laser according to the predetermined pulse width parameter, or project laser according to the predetermined current parameter and the predetermined frame rate parameter, or project laser according to the predetermined current parameter and the predetermined pulse width parameter, or project laser according to the predetermined frame rate parameter and the predetermined pulse width parameter, or project laser according to the predetermined current parameter, the predetermined frame rate parameter and the predetermined pulse width parameter.

For preventing the human eye from being harmed by the laser projected by the laser projector 10, when the distance between the human eye and the laser projector 10 is shorter, the predetermined current parameter is smaller, the predetermined frame rate parameter is smaller and the predetermined pulse width parameter is smaller. For example, if the distance between the human eye and the laser projector 10 is d, when the distance meets d≥20 cm, the laser projector 10 may project laser according to a current parameter T0, frame rate parameter F0 and pulse width parameter P0 for normal work; when the distance meets 10≤d<20 cm, the laser projector 10 projects laser according to a current parameter I1, a frame rate parameter F1 and a pulse width parameter P1; and when the distance meets d<20 cm, the laser projector 20 projects laser according to a current parameter I2, a frame rate parameter F2 and a pulse width parameter P2, where I2<I1<I0, F2<F1<F0, and P2<P1<P0.

From the above, in the terminal 100 of the implementation modes of the application, the control system 30 may control the parameter of the laser projected by the laser projector 10 according to the distance between the human eye and the laser projector 10. Specifically, when the distance between the human eye and the laser projector 10 is short, the current parameter, frame rate parameter and pulse width parameter for laser projection of the laser projector 10 are reduced, thereby preventing the eyes of the user from being harmed.

Figure 4A:
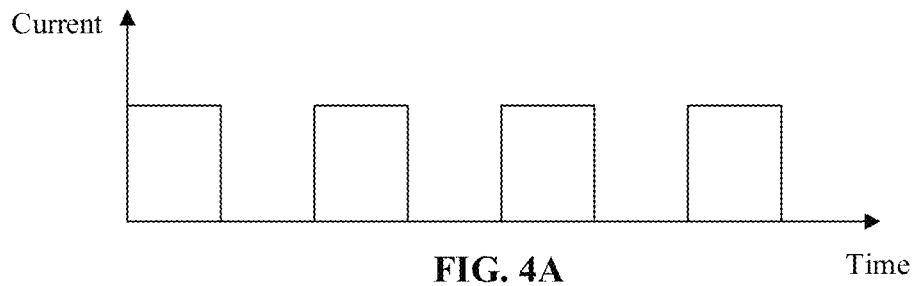
FIG. 4A and FIG. 4B are schematic diagrams of a current parameter for laser projection of a laser projector according to an implementation mode of the application.
Figure 4B:
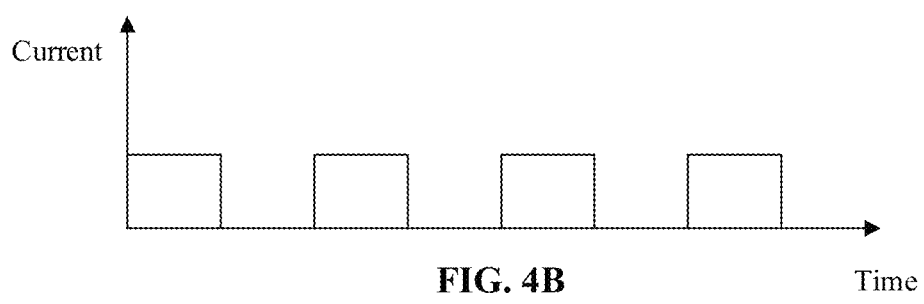

In combination with FIG. 4, in some implementation modes, the parameter for laser projection of the laser projector 10 may include the current parameter. The application processor 33 may be configured to send a first control signal to the microprocessor 35 in a case that the distance between the human eye and the laser projector 10 is longer than a predetermined distance. The microprocessor 35 may control the first driving circuit 31 according to the first control signal to enable the laser projector 10 to project laser according to a first current parameter (as shown in FIG. 4A). The application processor 33 may be configured to, when the distance between the human eye and the laser projector 10 is less than or equal to the predetermined distance, send a second control signal to the microprocessor 35. The microprocessor 35 may control the first driving circuit 31 according to the second control signal to enable the laser projector 10 to project laser according to a second current parameter (as shown in FIG. 4B). Herein, the second current parameter is smaller than the first current parameter. It can be understood that the predetermined distance may be understood as a safe distance for the human eye, and when the distance between the human eye and the laser projector 10 is longer than the predetermined distance, the laser projector 10 may keep projecting laser according to the current parameter (i.e., the first current parameter) for normal work if breakage, separation or the like does not occur to a Diffractive Optical Element (DOE), a collimating element and the like of the laser projector 10. When the distance between the human eye and the laser projector 10 is less than or equal to the predetermined distance, the distance between the human eye and the laser projector 10 is too short, and the current parameter of the laser projector 10 is required to be reduced to ensure the safety of the human eye.

Figure 5A:
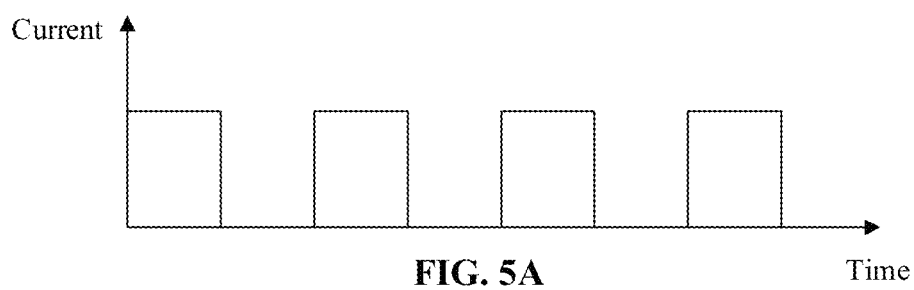
FIG. 5A and FIG. 5B are schematic diagrams of a frame rate parameter for laser projection of a laser projector according to an implementation mode of the application.
Figure 5B:
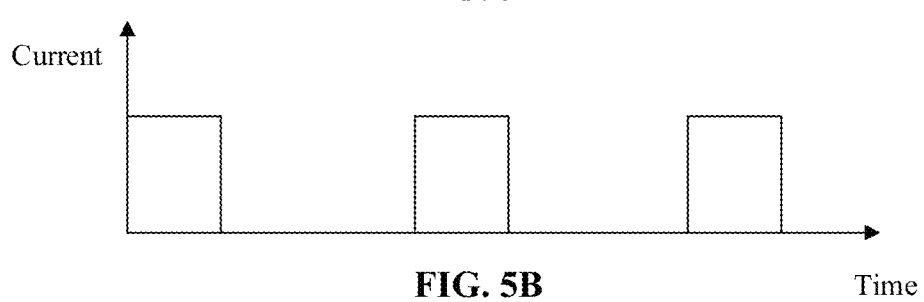

In combination with FIG. 5, in some implementation modes, the parameter for laser projection of the laser projector 10 may include the frame rate parameter. The application processor 33 may be configured to send the first control signal to the microprocessor 35 in a case that the distance between the human eye and the laser projector 10 is longer than the predetermined distance. The microprocessor 35 may control the first driving circuit 31 according to the first control signal to enable the laser projector 10 to project laser according to a first frame rate parameter (as shown in FIG. 5A). The application processor 33 may be configured to, when the distance between the human eye and the laser projector 10 is less than or equal to the predetermined distance, send the second control signal to the microprocessor 35. The microprocessor 35 may control the first driving circuit 31 according to the second control signal to enable the laser projector 10 to project laser according to a second frame rate parameter (as shown in FIG. 5B). Herein, the second frame rate parameter is smaller than the first frame rate parameter. It can be understood that the predetermined distance may be the safe distance for the human eye, and when the distance between the human eye and the laser projector 10 is longer than the predetermined distance, the laser projector 10 may keep projecting laser according to the frame rate parameter (i.e., the first frame rate parameter) for normal work if breakage, separation and the like does not occur to the DOE, a collimating element and the like of the laser projector 10. When the distance between the human eye and the laser projector 10 is less than or equal to the predetermined distance, the distance between the human eye and the laser projector 10 is too short, and the frame rate parameter of the laser projector 10 is required to be reduced to ensure the safety of the human eye.

Figure 6A:
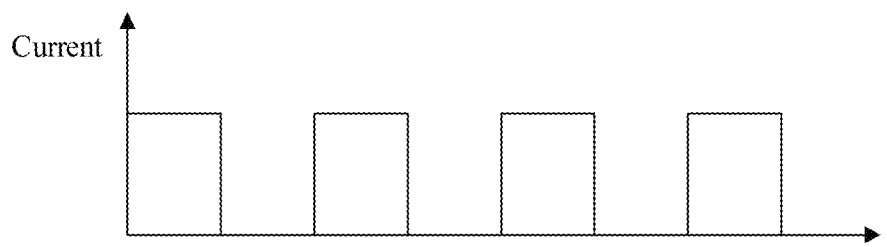
FIG. 6A and FIG. 6B are schematic diagrams of a pulse width parameter for laser projection of a laser projector according to an implementation mode of the application.
Figure 6B:
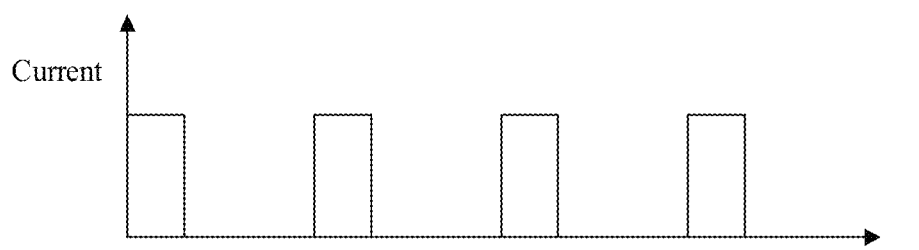

In combination with FIG. 6, in some implementation modes, the parameter for laser projection of the laser projector 10 may include the pulse width parameter. The application processor 33 may be configured to, when the distance between the human eye and the laser projector 10 is longer than the predetermined distance, send the first control signal to the microprocessor 35. The microprocessor 35 may control the first driving circuit 31 according to the first control signal to enable the laser projector 10 to project laser according to a first pulse width parameter (as shown in FIG. 6A). The application processor 33 may be configured to, when the distance between the human eye and the laser projector 10 is less than or equal to the predetermined distance, send the second control signal to the microprocessor 35. The microprocessor 35 may control the first driving circuit 31 according to the second control signal to enable the laser projector 10 to project laser according to a second pulse width parameter (as shown in FIG. 6B). The second pulse width parameter is smaller than the first pulse width parameter. It can be understood that the predetermined distance may be the safe distance for the human eye, and when the distance between the human eye and the laser projector 10 is longer than the predetermined distance, the laser projector 10 may keep projecting laser according to the pulse width parameter (i.e., the first pulse width parameter) for normal work if breakage, separation and the like does not occur to the DOE, a collimating element and the like of the laser projector 10. When the distance between the human eye and the laser projector 10 is less than or equal to the predetermined distance, the distance between the human eye and the laser projector 10 is too short, and the pulse width parameter of the laser projector 10 is required to be reduced to ensure the safety of the human eye.

Figure 7:
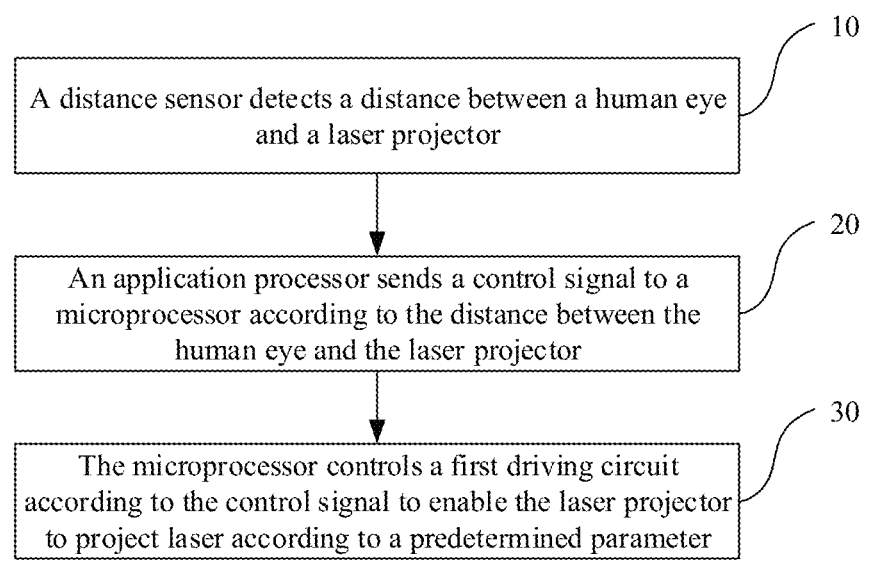
FIG. 7 to FIG. 11 are flowcharts of a control method for a laser projector according to an implementation mode of the application.

Referring to FIG. 2 and FIG. 7, the laser projector 10 of the implementation modes of the application is connected with the first driving circuit 31. A control method for the laser projector 10 may include the following steps.

In Step 10, a distance sensor 36 detects a distance between a human eye and the laser projector 10.

In Step 20, an application processor 33 sends a control signal to a microprocessor 35 according to the distance between the human eye and the laser projector 10.

In Step 30, the microprocessor 35 controls the first driving circuit 31 according to the control signal to enable the laser projector 10 to project laser according to a predetermined parameter.

According to the control method of the implementation modes of the application, the parameter for laser projection of the laser projector 10 may be controlled according to the distance between the human eye and the laser projector 10. Specifically, when the distance between the human eye and the laser projector 10 is short, a current parameter, frame rate parameter and pulse width parameter for laser projection of the laser projector 10 are reduced, thereby preventing eyes of a user from being harmed. Implementation details of the control method may refer to specific descriptions about the terminal 100 and will not be elaborated herein.

Figure 8:
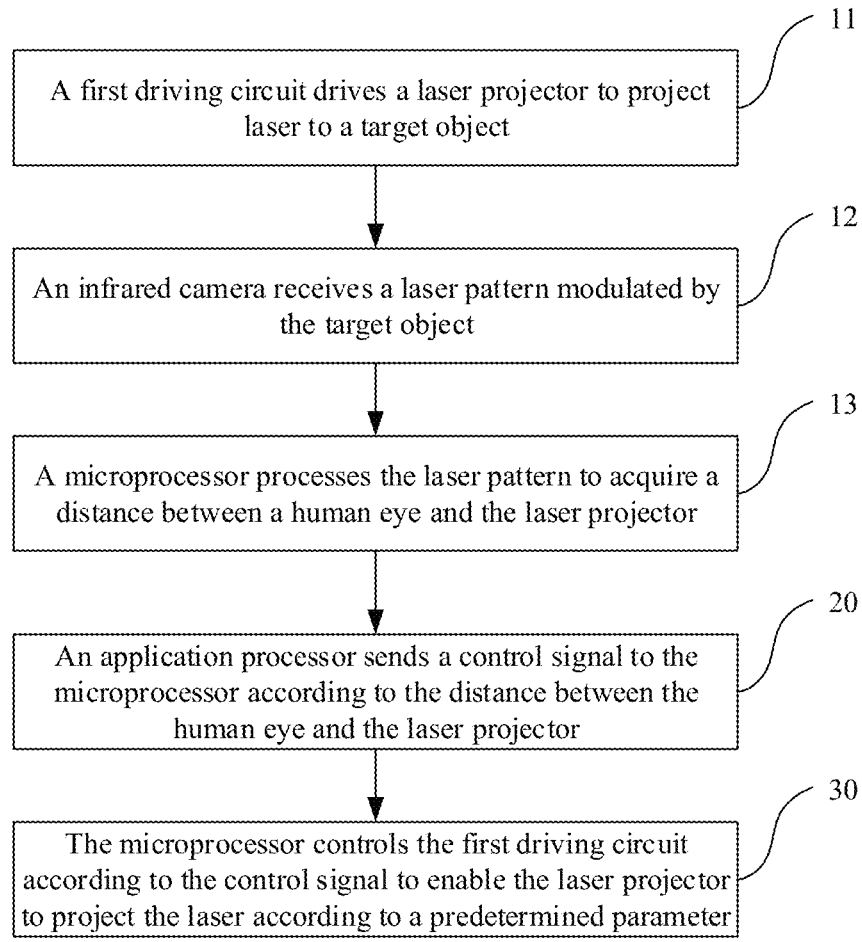

Referring to FIG. 3 and FIG. 8, Step 10 may be replaced with Step 11, Step 12 and Step 13. That is, the control method for the laser projector 10 may include the following steps.

In Step 11, the first driving circuit 31 drives the laser projector 10 to project laser to a target object.

In Step 12, an infrared camera 20 receives a laser pattern modulated by the target object.

In Step 13, the microprocessor 35 processes the laser pattern to acquire the distance between the human eye and the laser projector 10.

In Step 20, the application processor 33 sends a control signal to the microprocessor 35 according to the distance between the human eye and the laser projector 10.

In Step 30, the microprocessor 35 controls the first driving circuit 31 according to the control signal to enable the laser projector 10 to project laser according to the predetermined parameter.

Figure 9:
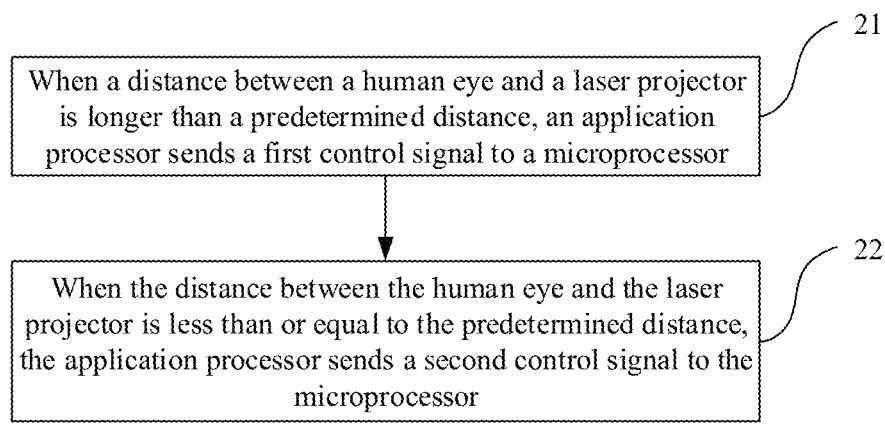

In combination with FIG. 9, in some implementation modes, the step (i.e., Step 20) that the application processor 33 sends a control signal to the microprocessor 35 according to the distance between the human eye and the laser projector 10 includes the following steps.

In Step 21, when the distance between the human eye and the laser projector 10 is longer than a predetermined distance, the application processor 33 sends a first control signal to the microprocessor 35.

In Step 22, when the distance between the human eye and the laser projector 10 is less than or equal to the predetermined distance, the application processor 33 sends a second control signal to the microprocessor 35.

Figure 10:
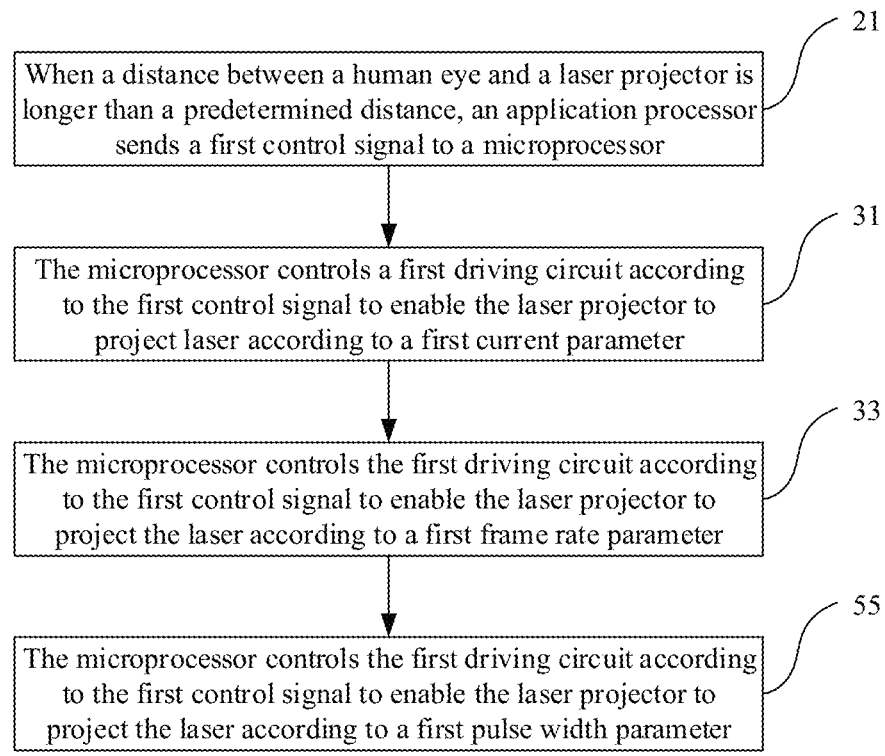
Figure 11:
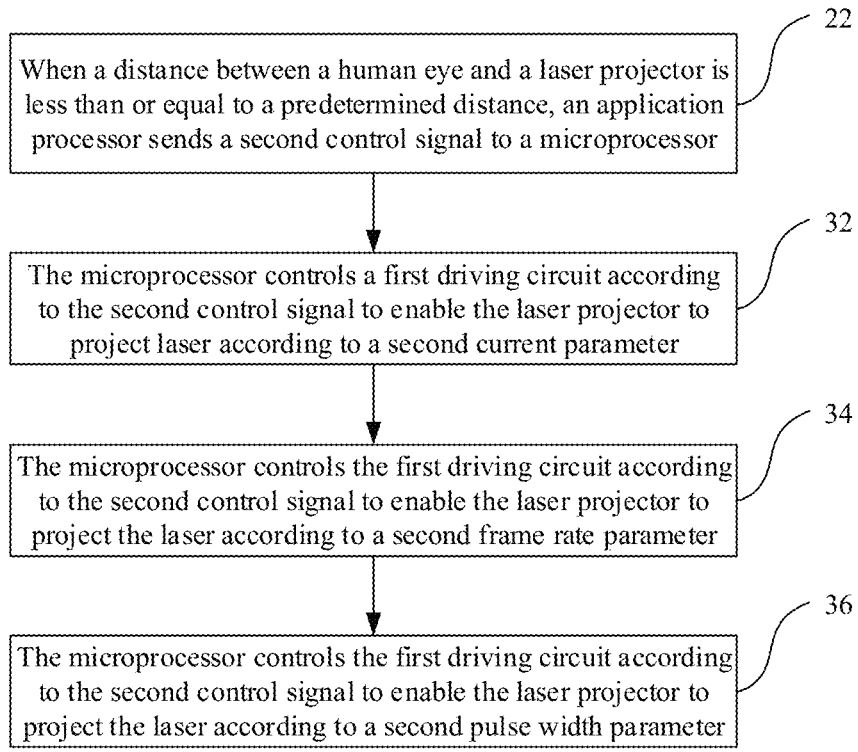

In combination with FIG. 10 and FIG. 11, the parameter includes a current parameter, and the step (i.e., Step 30) that the microprocessor 35 controls the first driving circuit 31 according to the control signal to enable the laser projector 10 to project laser according to the predetermined parameter includes the following steps.

In Step 31, the microprocessor 35 controls the first driving circuit 31 according to the first control signal to enable the laser projector 10 to project laser according to a first current parameter.

In Step 32, the microprocessor 35 controls the first driving circuit 31 according to the second control signal to enable the laser projector 10 to project laser according to a second current parameter. Herein, the second current parameter is smaller than the first current parameter.

In some implementation modes, the parameter includes a frame rate parameter, and the step (i.e., Step 50) that the microprocessor 35 controls the first driving circuit according to the control signal to enable the laser projector 10 to project laser according to the predetermined parameter may include the following steps.

In Step 33, the microprocessor 35 controls the first driving circuit 31 according to the first control signal to enable the laser projector 10 to project laser according to a first frame rate parameter.

In Step 34, the microprocessor 35 controls the first driving circuit 31 according to the second control signal to enable the laser projector 10 to project laser according to a second frame rate parameter. Herein, the second frame rate parameter is smaller than the first frame rate parameter.

In some implementation modes, the parameter includes a pulse width parameter, and the step (i.e., Step 50) that the microprocessor 35 controls the first driving circuit according to the control signal to enable the laser projector 10 to project laser according to the predetermined parameter may include following steps.

In Step 35, the microprocessor 35 controls the first driving circuit 31 according to the first control signal to enable the laser projector 10 to project laser according to a first pulse width parameter.

In Step 36, the microprocessor 35 controls the first driving circuit 31 according to the second control signal to enable the laser projector 10 to project laser according to a second pulse width parameter. Herein, the second pulse width parameter is smaller than the first pulse width parameter.

Figure 12:
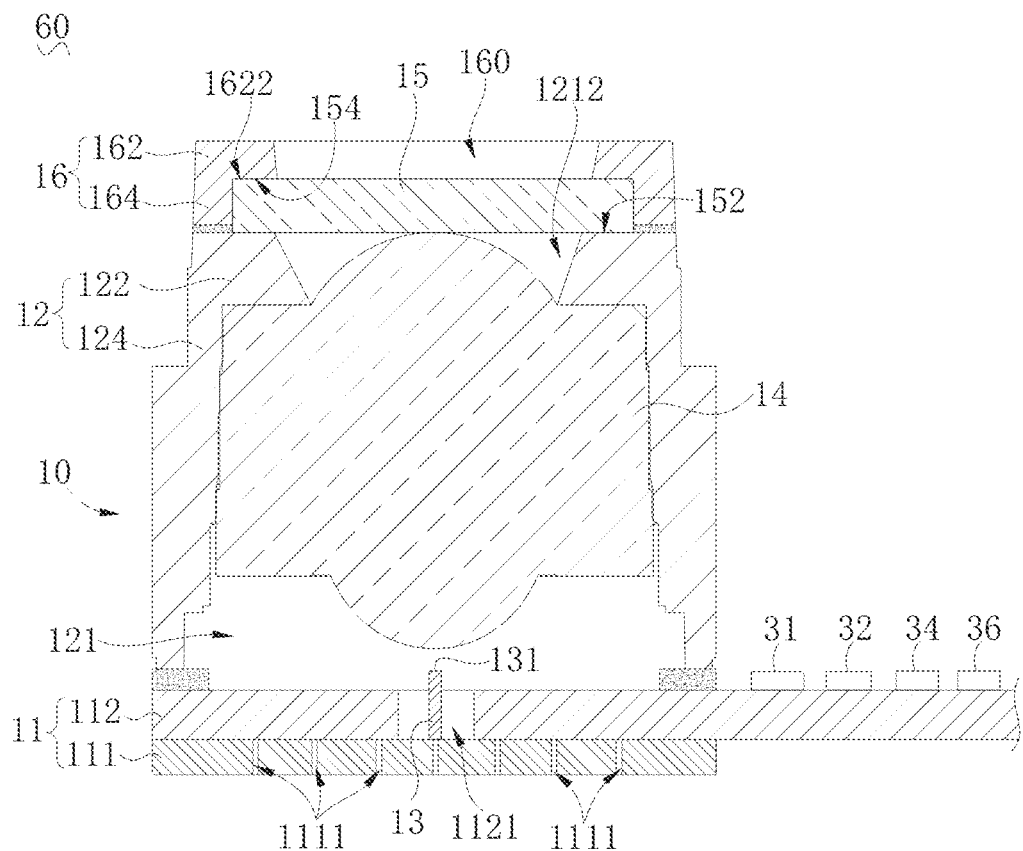
FIG. 12 is a structure diagram of a laser projection component according to an implementation mode of the application.

Referring to FIG. 12, the implementation modes of the application also provide a laser projection component 60. The laser projection component 60 includes a laser projector 10, a first driving circuit 31, a second driving circuit 32 and a monitoring timer 34. In such case, all of the first driving circuit 31, the second driving circuit 32 and the monitoring timer 34 may be integrated into a substrate component 11 of the laser projector 10.

Referring to FIG. 12, in some implementation modes, the laser projector 10 includes a substrate component 11, a lens barrel 12, a light source 13, a collimating element 14, a diffractive optical elements (DOE) 15 and a protective cover 16.

The substrate component 11 may include a substrate 111 and a circuit board 112. The circuit board 112 may be arranged on the substrate 111, the circuit board 112 may be configured to connect the light source 13 with a main board of the terminal 100, and the circuit board 112 may be a rigid board, a flexible board or a rigid-flexible board. In the embodiment shown in FIG. 12, a through hole 1121 is formed in the circuit board 112, and the light source 13 is fixed on the substrate 111 and electrically connected with the circuit board 112. Radiation holes 1111 may be formed in the substrate 111, and heat generated when the light source 13 or the circuit board 112 works may be dissipated through the radiation holes 1111. The radiation holes 1111 may further be filled with a thermally conductive adhesive to further improve radiation performance of the substrate component 11.

The lens barrel 12 may be fixedly connected with the substrate component 11. An accommodation cavity 121 may be formed in the lens barrel 12. The lens barrel 12 may include a top wall 122 and an annular circumferential wall 124 extending from the top wall 122. The circumferential wall 124 may be arranged on the substrate component 11. A light transmission hole 1212 communicated with the accommodation cavity 121 may be formed in the top wall 122. The circumferential wall 124 may be connected with the circuit board 112 through an adhesive.

The protective cover 16 may be arranged on the top wall 122. The protective cover 16 may include a baffle plate 162 with a light emergent through hole 160 and an annular sidewall 164 extending from the baffle plate 162.

Both of the light source 13 and the collimating element 14 may be arranged in the accommodation cavity 121. The DOE 15 may be mounted on the lens barrel 12. The collimating element 14 and the DOE 15 may be sequentially arranged on a light emission path of the light source 13. The collimating element 14 may collimate laser emitted by the light source 13, and the laser may penetrate through the collimating element 14 and then penetrate through the DOE 15 to form a laser pattern.

Figure 13:
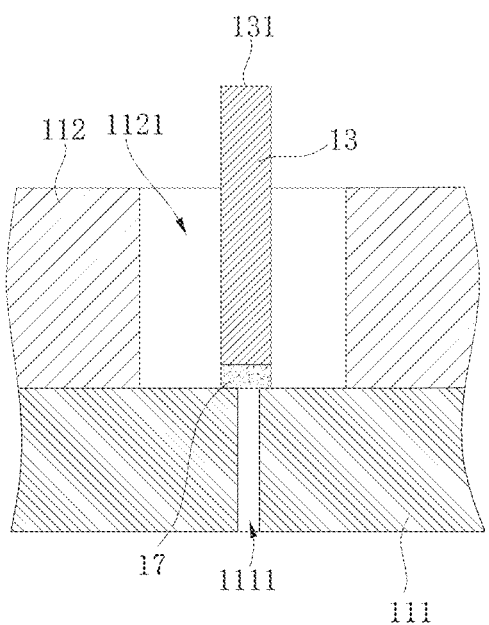
FIG. 13 to FIG. 15 are partial structure diagrams of a laser projector according to an implementation mode of the application.
Figure 14:
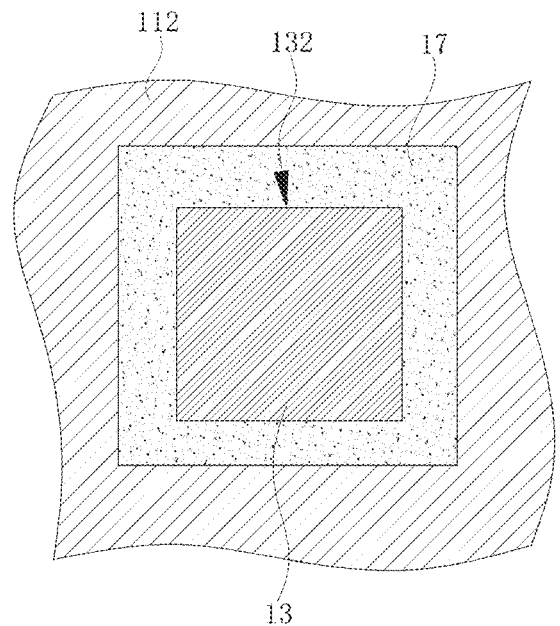

The light source 13 may be a Vertical Cavity Surface Emitting Laser (VCSEL) or an Edge-Emitting Laser (EEL). In the embodiment shown in FIG. 12, the light source is the EEL, and specifically, the light source 13 may be a Distributed Feedback Laser (DFB). The light source 13 may be configured to emit the laser into the accommodation cavity 121. In combination with FIG. 13, the light source 13 may be wholly columnar; the end face, far away from the substrate component 11, of the light source 13 may form a light emission surface 131; the laser may be emitted from the light emission surface 131, and the light emission surface 131 may face to the collimating element 14. The light source 13 may be fixed on the substrate component 11. Specifically, the light source 13 may be adhered to the substrate component 11 through a sealing adhesive 17. For example, the surface, opposite to the light emission surface 131, of the light source 13 may be adhered to the substrate component 11. In combination with FIG. 12 and FIG. 14, a lateral surface 132 of the light source 13 may also be adhered to the substrate component 11, and the sealing adhesive 17 may wrap the surrounding lateral surface 132, and may also adhere one surface of the lateral surface 132 to the substrate component 11 or adhere some surfaces to the substrate component 11. In such case, the sealing adhesive 17 may be a thermally conductive adhesive, to conduct the heat generated when the light source 13 works into the substrate component 11.

Referring to FIG. 12, the DOE 15 is arranged on the top wall 122 and accommodated in the protective cover 16. Opposite two sides of the DOE 15 may be pressed against the protective cover 16 and the top wall 122 respectively. The baffle plate 162 may include a pressing surface 1622 close to the light transmission hole 1212. The DOE 15 may be pressed against the pressing surface 1622.

Specifically, the DOE 15 may include a diffractive incident surface 152 and diffractive emergent surface 154 which are opposite to each other. The DOE 15 may be arranged on the top wall 122, the diffractive emergent surface 154 may be pressed against the surface (the pressing surface 1622), close to the light transmission hole 1212, of the baffle plate 162, and the diffractive incident surface 152 may be pressed against the top wall 122. The light transmission hole 1212 may be aligned with the accommodation cavity 121, and the light emergent through hole 160 may be aligned with the light transmission hole 1212. The top wall 122, the annular sidewall 164 and the baffle plate 162 may be pressed against the DOE 15, thereby preventing the DOE 15 from being separated from the interior of the protective cover 16 in a light emergent direction. In some implementation modes, the protective cover 16 may be adhered to the top wall 122 through glue.

The light source 13 of the laser projector 10 may adopt an EEL. On one hand, compared with a VCSEL array, the EEL is less in temperature drift. On the other hand, the EEL adopts a single-point light emission structure without needing of designing an array structure, which makes the manufacture easy and enables the cost of the light source of the laser projector 10 to be low.

When laser of a DFB is propagated, a power gain is obtained by feedback of a grating structure. For improving the power of the DFB, it is required to increase an injected current and/or increase a length of the DFB. Since increasing the injected current may increase power consumption of the DFB and bring a heating problem, it is required to increase the length of the DFB to ensure normal work of the DFB, which makes the DFB usually present a slender strip structure. When the light emission surface 131 of the EEL faces the collimating element 14, the EEL is vertically placed. Since the EEL is of the slender strip structure, the EEL is likely to fall, displace or shake. Therefore, the sealing adhesive 17 may be arranged to fix the EEL to prevent the EEL from falling, displacement or shaking.

Figure 15:
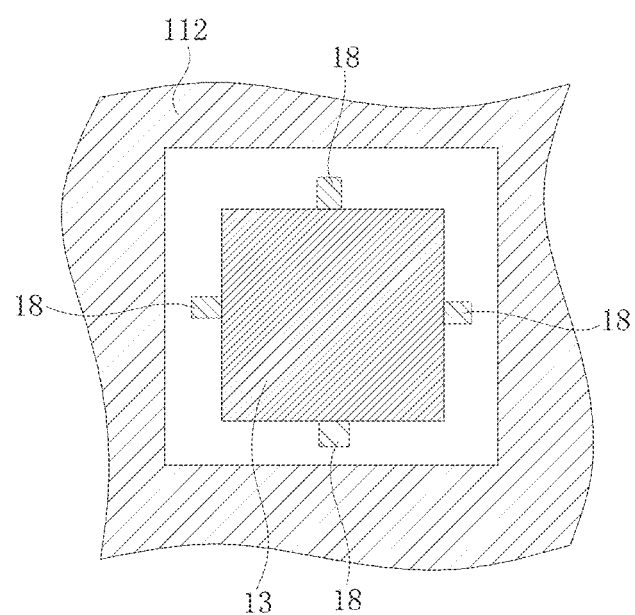

Referring to FIG. 12 and FIG. 15, in some implementation modes, the light source 13 may also be fixed on the substrate component 11 in a fixing manner shown in FIG. 15. Specifically, the laser projector 10 includes multiple support blocks 18. The support blocks 18 may be fixed on the substrate component 11, the multiple support blocks 18 surround the light source 13. During mounting, the light source 13 may be directly mounted among the multiple support blocks 18. In an example, the multiple support blocks 18 clamp the light source 13 to further prevent the light source 13 from shaking.

In some implementation modes, the protective cover 16 may be omitted. In such case, the DOE 15 may be arranged in the accommodation cavity 121, the diffractive emergent surface 154 of the DOE 15 may be pressed against the top wall 122, and the laser penetrates through the DOE 15 and then penetrates through the light transmission hole 1212. Therefore, the DOE 15 is unlikely to separate. In some implementation modes, the substrate 111 may be omitted, and the light source 13 may be directly fixed on the circuit board 112 to reduce an overall thickness of the laser projector 10.

In the descriptions of the specification, the descriptions made with reference to terms "certain implementation modes", "an implementation mode", "some implementation modes", "schematic implementation mode", "example", "specific example", "some examples" or the like refer to that specific features, structures, materials or characteristics described in combination with the implementation modes or the examples are included in at least one implementation mode or example of the application. In the specification, these terms are not always schematically expressed for the same implementation mode or example. Moreover, the specific described features, structures, materials or characteristics may be combined in a proper manner in any one or more implementation modes or examples.

In addition, terms "first" and "second" are only adopted for description and should not be understood to indicate or imply relative importance or implicitly indicate the number of indicated technical features. Therefore, features defined by "first" and "second" may explicitly or implicitly indicate inclusion of at least one such feature. In the application, "multiple" means at least two, for example, two and three, unless otherwise limited definitely and specifically.

The embodiments of the application have been shown or described above. However, it can be understood that the abovementioned embodiments are exemplary and should not be understood as limits to the application and those of ordinary skill in the art may make variations, modifications, replacements, transformations to the abovementioned embodiments within the scope of the application. The scope of the application is defined by the claims and equivalents thereof.

The invention claimed is:

1. A control system for a laser projector, comprising:
a first driving circuit, connected with the laser projector and configured to drive the laser projector to project laser to a target project;
an infrared camera, configured to acquire an infrared image of a user;
a microprocessor, connected with the first driving circuit and the infrared camera, and configured to detect a distance between a human eye of the user and the laser projector; and
an application processor, connected with the microprocessor,
wherein the application processor is configured to send a control signal to the microprocessor according to the distance between the human eye and the laser projector, and the microprocessor is configured to control the first driving circuit according to the control signal to enable the laser projector to project laser according to a predetermined parameter which comprises at least one of a current parameter, a frame rate parameter or a pulse width parameter; and
the microprocessor is configured to detect a face key point of the infrared image to determine a two-dimensional coordinate of the human eye, then register and align the infrared image and a depth image, search for a corresponding feature point corresponding to the human eye in the depth image according to the two-dimensional coordinate of the human eye, then acquire a three dimensional coordinate of the corresponding feature point and acquire the distance between the human eye and the laser projector according to the three-dimensional coordinate of the corresponding feature point.

2. The control system of claim 1, wherein in a case that the predetermined parameter comprises a current parameter, the application processor is configured to, when the distance between the human eye and the laser projector is longer than a predetermined distance, send a first control signal to the microprocessor, and the microprocessor predetermined the first driving circuit according to the first control signal to enable the laser projector to project laser according to a first current parameter; and the application processor is configured to, when the distance between the human eye and the laser projector is less than or equal to the predetermined distance, send a second control signal to the microprocessor, and the microprocessor predetermined the first driving circuit according to the second control signal to enable the laser projector to project laser according to a second current parameter, the second current parameter being smaller than the first current parameter.

3. The control system of claim 1, wherein the laser projector is configured to project laser to the target object according to a preset period to periodically acquire the distance between the human eye and the laser projector.

4. The control system of claim 1, further comprising:
a second driving circuit, connected with the first driving circuit and configured to supply power to the first driving circuit.

5. A terminal, comprising:
a laser projector; and
a control system comprising:
  a first driving circuit, connected with the laser projector and configured to drive the laser projector to project laser to a target project;
  an infrared camera, configured to acquire an infrared image of a user;
  a microprocessor, connected with the first driving circuit and the infrared camera, and configured to detect a distance between a human eye of the user and the laser projector; and
  an application processor, connected with the microprocessor;
  wherein the application processor is configured to send a control signal to the microprocessor according to the distance between the human eye and the laser projector, and the microprocessor is configured to control the first driving circuit according to the control signal to enable the laser projector to project laser according to a predetermined parameter which comprises at least one of a current parameter, a frame rate parameter or a pulse width parameter; and
  the microprocessor is configured to detect a face key point of the infrared image to determine a two-dimensional coordinate of the human eye, then register and align the infrared image and a depth image, search for a corresponding feature point corresponding to the human eye in the depth image according to the two-dimensional coordinate of the human eye, then acquire a three dimensional coordinate of the corresponding feature point and acquire the distance between the human eye and the laser projector according to the three-dimensional coordinate of the corresponding feature point.

6. A control method for a laser projector, the laser projector being connected with a first driving circuit, and the control method comprising;

driving, by the first driving circuit, the laser projector to project laser to a target object acquiring, by an infrared camera, an infrared image of a user; and detecting, by a microprocessor connected with both the first driving circuit and the infrared camera, a distance between a human eye of the user and the laser projector;

sending, by an application processor connected with the microprocessor, a control signal to the microprocessor according to the distance between the human eye and the laser projector; and controlling, by the microprocessor, the first driving circuit according to the control signal to enable the laser projector to project laser according to a predetermined parameter which comprises at least one of a current parameter, a frame rate parameter or a pulse width parameter;

wherein detecting the distance between the human eye of the user and the laser projector comprises:

detecting, by the microprocessor, a face key point of the infrared image to determine a two-dimensional coordinate of the human eye, then register and align the infrared image and a depth image, search for a corresponding feature point corresponding to the human eye in the depth image according to the two-dimensional coordinate of the human eye, then acquire a three dimensional coordinate of the corresponding feature point and acquire the distance between the human eye and the laser projector according to the three-dimensional coordinate of the corresponding feature point.

7. The control method of claim 6, wherein the step of sending, by the application processor, the control signal to the microprocessor according to the distance between the human eye and the laser projector comprises:

when the distance between the human eye and the laser projector is longer than a predetermined distance, sending, by the application processor, a first control signal to the microprocessor; and when the distance between the human eye and the laser projector is less than or equal to the predetermined distance, sending, by the application processor, a second control signal to the microprocessor.

8. The control method of claim 7, wherein
in a case that the parameter comprises a current parameter, the step of controlling, by the microprocessor, the first driving circuit according to the control signal to enable the laser projector to project laser according to the predetermined parameter comprises:

controlling, by the microprocessor, the first driving circuit according to the first control signal to enable the laser projector to project laser according to a first current parameter; and controlling, by the microprocessor, the first driving circuit according to the second control signal to enable the laser projector to project laser according to a second current parameter, the second current parameter being smaller than the first current parameter.

9. The control system of claim 1, wherein in a case that the parameter comprises a frame rate parameter,
the application processor is configured to, when the distance between the human eye and the laser projector is longer than a predetermined distance, send a first control signal to the microprocessor, and the microprocessor is configured to control the first driving circuit according to the first control signal to enable the laser projector to project laser according to a first frame rate parameter; and the application processor is configured to, when the distance between the human eye and the laser projector is less than or equal to the predetermined distance, send a second control signal to the microprocessor, and the microprocessor is configured to control the first driving circuit according to the second control signal to enable the laser projector to project laser according to a second frame rate parameter, the second frame rate parameter being smaller than the first frame rate parameter.

10. The control system of claim 1, wherein in a case that the parameter comprises a pulse width parameter, the application processor is configured to, when the distance between the human eye and the laser projector is longer than a predetermined distance, send a first control signal to the microprocessor, and the microprocessor is configured to control the first driving circuit according to the first control signal to enable the laser projector to project laser according to a first pulse width parameter; and the application processor is configured to, when the distance between the human eye and the laser projector is less than or equal to the predetermined distance, send a second control signal to the microprocessor, and the microprocessor is configured to control the first driving circuit according to the second control signal to enable the laser projector to project laser according to a second pulse width parameter, the second pulse width parameter being smaller than the first pulse width parameter.

11. The control method of claim 7, wherein in a case that the parameter comprises a frame rate parameter, the step of controlling, by the microprocessor, the first driving circuit according to the control signal to enable the laser projector to project laser according to the predetermined parameter comprises:

controlling, by the microprocessor, the first driving circuit according to the first control signal to enable the laser projector to project laser according to a first frame rate parameter; and controlling, by the microprocessor, the first driving circuit according to the second control signal to enable the laser projector to project laser according to a second frame rate parameter, the second frame rate parameter being smaller than the first frame rate parameter.

12. The control method of claim 7, wherein in a case that the parameter comprises a pulse width parameter, the step of controlling, by the microprocessor, the first driving circuit according to the control signal to enable the laser projector to project laser according to the predetermined parameter comprises:

controlling, by the microprocessor, the first driving circuit according to the first control signal to enable the laser projector to project laser according to a first pulse width parameter; and controlling, by the microprocessor, the first driving circuit according to the second control signal to enable the laser projector to project laser according to a second pulse width parameter, the second pulse width parameter being smaller than the first pulse width parameter.

* * * * *